Patented Feb. 27, 1923.

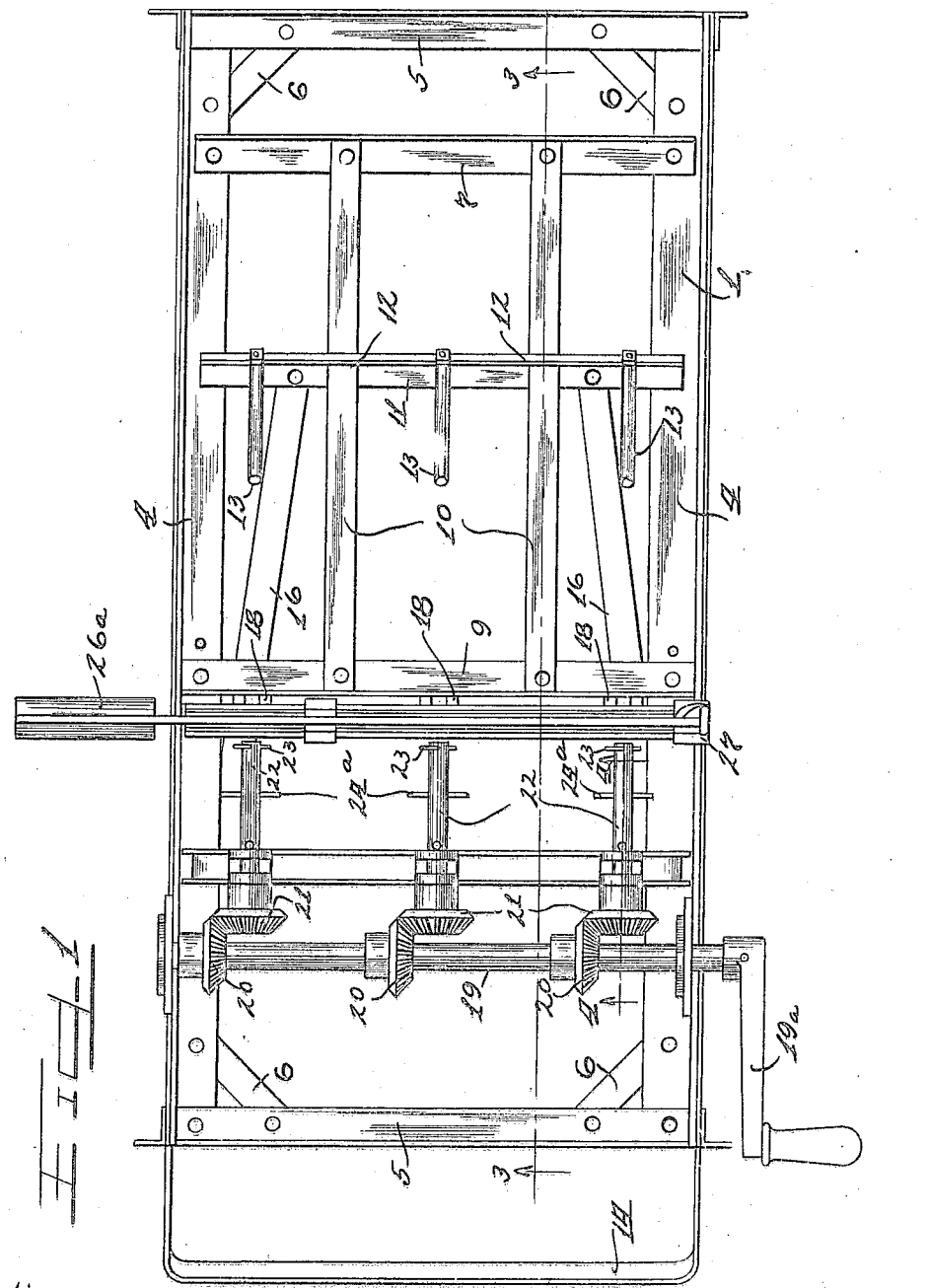

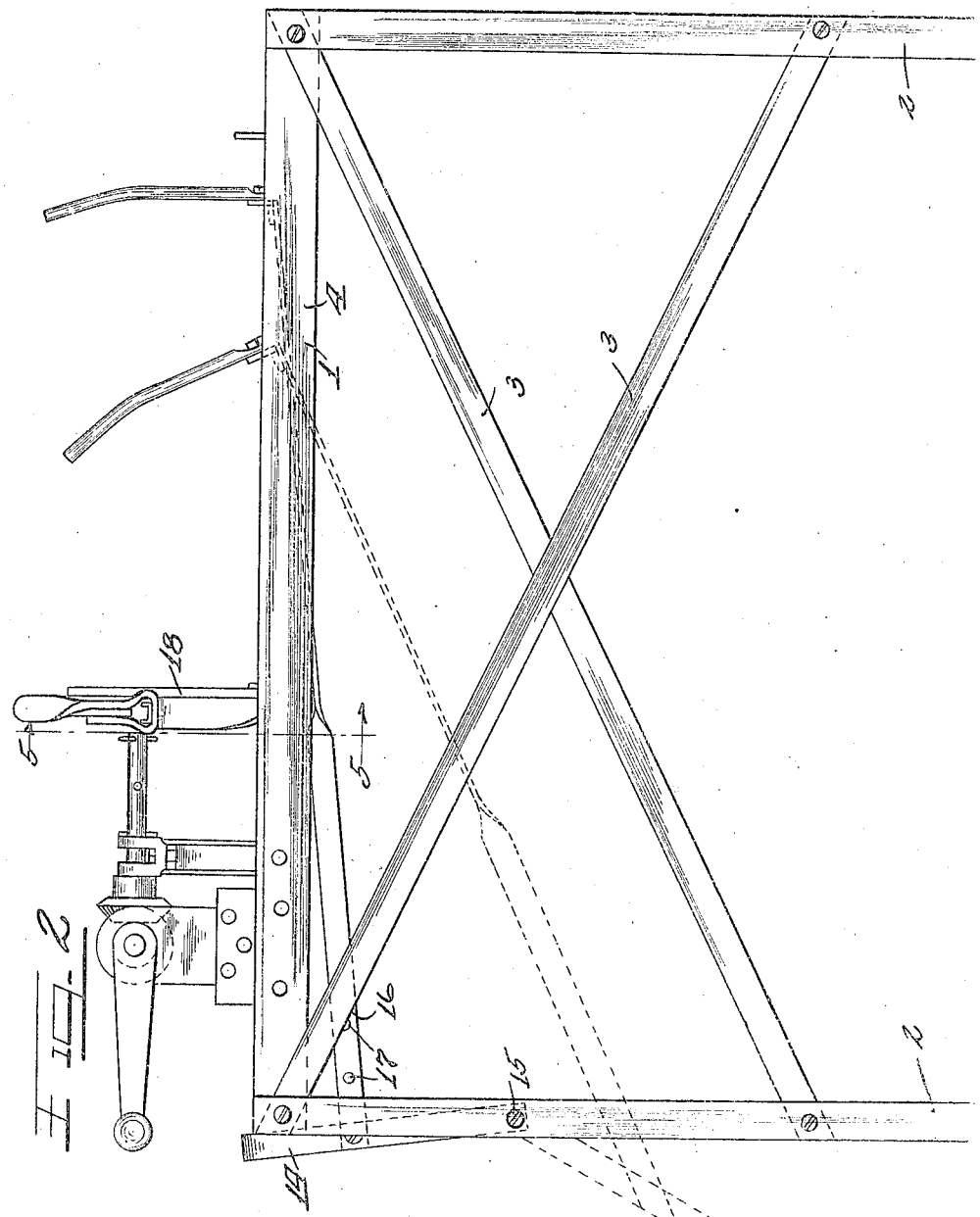

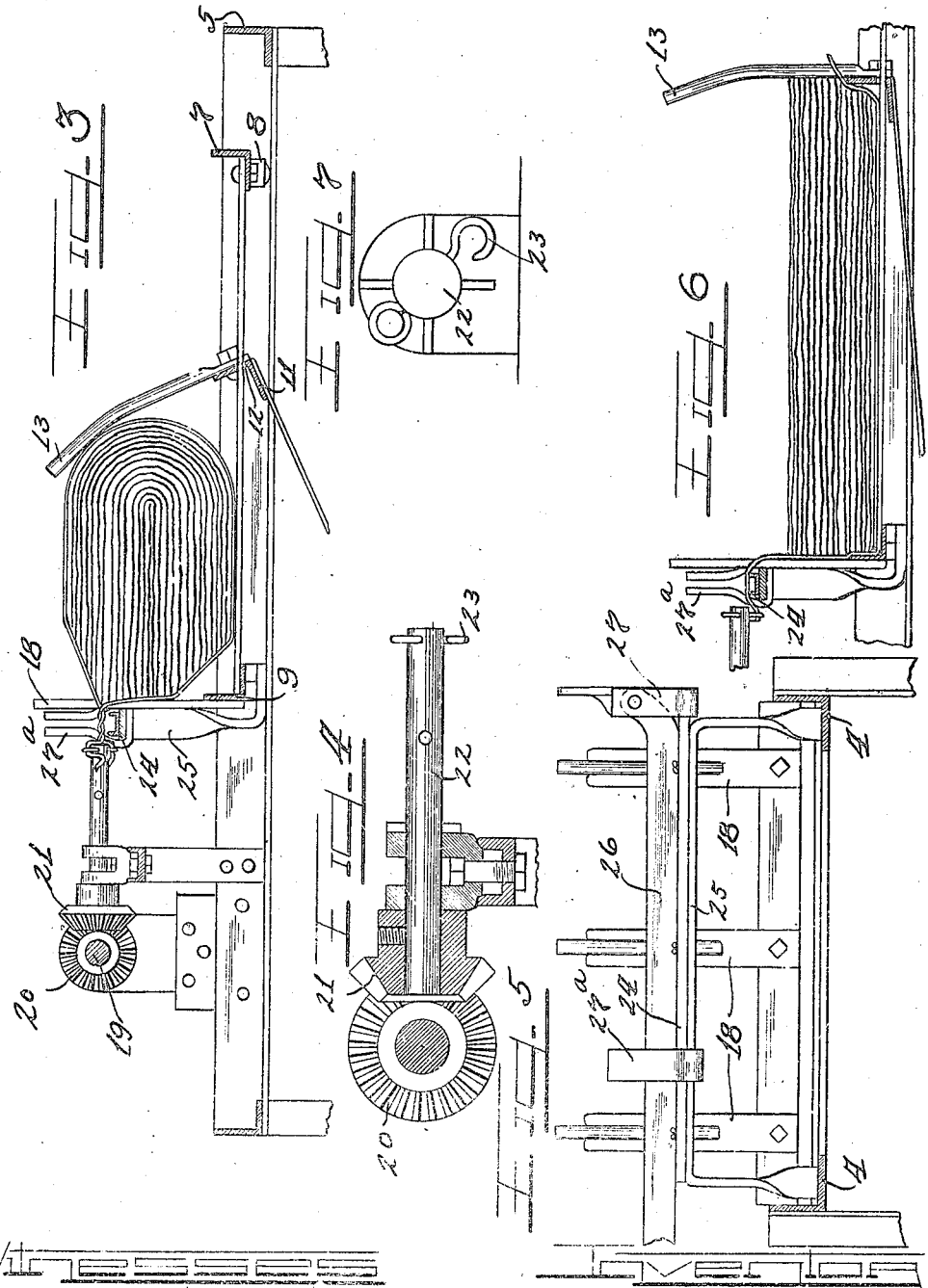

1,446,472

UNITED STATES PATENT OFFICE.

ROBERT McLAUGHLIN, OF MONMOUTH, ILLINOIS, ASSIGNOR OF ONE-HALF TO A. G. PATTON, OF MONMOUTH, ILLINOIS.

SACK BALER.

Application filed July 19, 1920. Serial No. 397,457.

*To all whom it may concern:*

Be it known that I, ROBERT McLAUGHLIN, a citizen of the United States, residing at Monmouth, in the county of Warren and State of Illinois, have invented a new and useful Improvement in Sack Balers; and I do hereby declare that the following is a full, clear, and exact description of the same, reference being had to the accompanying drawings, and to the numbers of reference marked thereon, which form a part of this specification.

My invention relates more particularly to a baling device designed primarily for baling sacks, but susceptible of a much wider use, in which the sacks or material to be bundled are placed, compressed and held compressed by a lever structure and in which a plurality of binding wires are simultaneously twisted and broken off, producing efficiency and rapidity in operation.

It is therefore an object of my invention to provide a baling device with a compressing means which will hold the material compressed.

It is also an object of my invention to provide means for simultaneously twisting a plurality of wires.

It is also an object of my invention to provide means for restricting the zone of the twisting so that a plurality of wires may be simultaneously severed by the twisting device.

It is an important object of my invention to provide a baler that is easily and quickly operated, that is cheap and efficient and simple in operation.

I attain these objects among others by the novel construction and arrangement of parts which will be more specifically pointed out hereinafter.

My invention (in a preferred form) is illustrated in the drawings and hereinafter more fully described.

On the drawings:

Fig. 1 is a top plan view of my improved baler.

Fig. 2 is a side elevation thereof.

Fig. 3 is a section on the line 3—3 of Fig. 1 illustrating a bundle of sacks in the baler as they are being formed.

Fig. 4 is a section on the line 4—4 of Fig. 1 on an enlarged scale.

Fig. 5 is a section on the line 5—5 of Fig. 2.

Fig. 6 is a longitudinal section showing a portion of a bundle of sacks in position on the baler.

Fig. 7 is a front elevational view of one of the wire twisting devices, on an enlarged scale.

Referring now to the different figures in the drawings in which similar reference numerals refer to similar features in the different views, 1 represents a supporting frame of any practical design or shape. As a matter of illustration, I have shown the frame as consisting of four legs, 2 preferably of small angle irons. These legs are spaced apart according to the size of frame that is desired and are braced by diagonal struts 3. Angle irons 4 are bolted or riveted longitudinally on the inner upper ends of the legs 2 and transverse end angles 5 are secured to the horizontal flanges of the angle 4 and are braced thereagainst by struts 6. To the horizontal flanges of the side angles 4 I secure a baling platform which should be constructed to suit the material that it is intended to bundle. In case where it is contemplated that sacks or similar material are to be bundled, this platform may consist of an angle piece 7 arranged transversely of the frame and supported loosely upon the horizontal flanges of the angles 4; a round ended stud 8 may be secured to each end of the angle 7 for supporting the same at a slight elevation on the angles 4, and, a second transverse angle 9 adjustably secured on the horizontal flange of angles 4.

Suitable shims or blocks may be used to elevate the angle 9 to bring the same in the same horizontal plane with angle 7. This angle 9 is preferably secured by bolts which can be easily withdrawn to adjust the platform with respect to the wire twisting devices to vary the twisted length of wire that is to remain on a handle, the angle member 4 being provided with a series of holes for this purpose. A plurality of plates 10 are longitudinally arranged and secured upon the angles 7 and 9 in spaced relation. The platform is provided with a reciprocating abutment or pressing device which consists of a transverse member 11 of angular section having a plurality of slots 12 to slidably receive the plates 10. A plurality of uprights 13 of any height or design are secured to member 11 in spaced relation and are adopted to bear against the sacks when the pressing device is drawn forward.

The pressing device is operated by means of a lever 14 of U formation, having each leg of the U pivotally secured to the front legs of the frame by pivots 15; links 16 connecting the lever with said pressing device. These links 16 are pivoted to the legs of the lever at a distance above the fulcrum thereof, and as the lever is lowered from the full line position shown in Fig. 2, a point will be reached just below the point of alinement of the links and lever legs where the pressure of the bundle on the platform will tend to draw the lever downwardly. When that point has been reached, the operator can remove his hands from the lever. In this way the lever becomes locked to the bale when a predetermined point has been reached in the operation of the lever. To accommodate the baler for different sizes of sacks or bundling matter, the links 16 are provided with a series of holes 17 whereby the effective length of the links may be varied.

The front end of the platform is provided with a plurality of bifurcated uprights 18, three being shown, of any convenient height. The bifurcations are designed to receive the wires and thus may be termed wire guides. These uprights are preferably bolted or secured in spaced relations to the front angle 9 and are adjustable therewith when the angle 9 is adjusted to shift the frame part of the platform.

The wire twisting mechanism comprises a transverse shaft 19 having a crank 19ª, suitably supported upon the frame in any well known manner having a plurality of bevel gears 20, three being shown. These gears are designed to mesh with corresponding bevel gears 21 secured to the shafts 22 arranged at right angles to the shaft 19 and suitably supported upon the frame. Each of the shafts 22 is provided near the rear end with wire receiving means 23 which may be in the form of eye or hook devices. If desirable, additional or supplemental wire securing pins 24ª may be provided around which the wire may be wrapped.

After the binding wires are sufficiently twisted so that the same are taut around the bundle, it is desirable that the surplus at the twisted ends be sheared or broken off. And for this purpose I have provided a mechanism which limits the zone of the twisting wires to a substantially short distance from the wire twisting shafts 22 so that the wires may be sheared off by twisting. As shown, this mechanism comprises a small shallow channel shaped or grooved member 24 supported on a bracket 25 on the frame, and a lever 26 having a handle 26ª pivoted in a guide bracket 27 secured to the channel member 24 at an end thereof. This lever is designed to fit in the groove of the channel member 24 and pinch the wires so that the twisting thereof will be confined substantially between the lever 26 and the shafts 22. As this distance is very short, it will not require many turns to break off the surplus of the wires. In order to properly guide the lever 26 into the groove, I have provided a guide member 27ª secured to the bracket 25, which has a pair of prongs spaced apart to readily admit the lever 26 into the groove. It should be particularly noted that by this means I can quickly shear or break off the surplus wire from each binder in one operation and at practically the same time. It should also be noted that if I did not limit the wire shearing zone but attempted to break the wires by twisting them after the bundle was securely bound, the wires might break or shear off so close to the bundle that the ends would fly apart. But by restricting the shearing zone or length, I avoid this objection and always secure a twisted end on the binding wires that cannot be torn apart.

*Operation.*

In the operation of my improved baler, it is contemplated that binding wires of approximately the right length be laid longitudinally upon the platform, the front parts of which being placed in the wire guides 18 and the front end of each wire may then be secured to the wire receiving means 23. Assuming that the lever 14 is in raised position, the sacks or material that are to be bundled are next placed upon the platform over the wires until a proper sized bundle is obtained, whereupon lever 14 is moved downwardly drawing the pressing device 11 forwardly to compress the sacks or material. When the lever has reached a point below its alinement with links 16, it will become locked. The operator can now bring the rear end of each wire up and over the bundle, through a wire guide 18 and secure the same to the proper securing means on a shaft 22, thus one end of a wire may be fastened to the eye of a securing means while the other end can be placed in the hook portion of the same securing means and secured thereto. When the ends of all the binding wires are thus secured the shaft 19 is rotated by means of crank 19ª to simultaneously operate the shafts until the twisting of the wires has bound them sufficiently taut around the bundle. The lever 26 which may have been in raised position, or may have been lightly resting on the wires, is then depressed; to pinch the wires into the groove and bind them against the ridges of the groove. Further rotation of the shafts 22 will now twist the wires between the front ridge of said groove and the ends of said shafts and as this distance is not very great, it will not require very many turns to break off the surplus ends. Lever 14 may now be raised to release the pressing device so that the bundle may be removed and if a different sized bundle is to be bound, the links 16 may be adjusted on lever 14, and if a longer twisting length is desired, the platform may be shifted rearwardly. It will accordingly be observed that I have invented a novel baling device, one that is simple in construction, efficient in service, easily and quickly operated, and adjustable. It is also characteristic of my invention that a plurality of ends of wire may be simultaneously twisted and broken off in a definite zone, and that the pressing device may be locked to hold the bundle in compressed form. It should also be noted that while my baler is primarily designed for baling sacks, it is susceptible of being used for bundling a variety of other things or substances.

I am aware that numerous details of construction may be varied through a wide range without departing from the principles of my invention and I therefore do not purpose limiting the patent granted otherwise than necessitated by the prior art.

I claim as my invention:

1. In a device of the class described, a plurality of rotatable wire twisting devices and a baling platform adjustable to vary the distance between the front end thereof and the said devices.

2. In a baler, a plurality of wire twisting devices, means adjacent thereto for optionally limiting the twisting zone, and a baling platform adjustable with respect to said means.

3. In a baler, a reciprocable pressing and holding device adapted for compressing and holding the material to be baled, a plurality of intergeared wire twisting devices, a grooved member and a lever co-operating with said grooved member adapted to receive the binding wires therebetween and restrict the twisting zone thereof at a selected time.

4. In a baler, a reciprocable pressing and baling device, a plurality of rotatable wire twisting devices, having bevelled gears, a driving shaft having a plurality of bevelled gears meshing with said first mentioned bevelled gears for simultaneously rotating said devices, mechanism for restricting the twisting zone at a selected time comprising a grooved member and a pivoted lever co-operating therewith and a baling platform adjustable with respect to said mechanism.

5. In a device of the class described, the combination with a baling platform, having a reciprocable presser, means to operate said presser and lock the same, wire twisting mechanism comprising a plurality of rotatable shafts having wire receiving and securing means, and a plurality of wire guiding uprights in alinement with said shafts.

6. In a baling device, wire twisting mechanism, and mechanism for restricting the twisting zone of the twisted wires to a quickly breakable length.

7. In a baling device, wire twisting mechanism, and a latch lever for latching said wires to a part of said baling device to restrict the twisting zone thereof for the purpose described.

8. In a baling device, means for pressing and holding the material to be baled, wire twisting mechanism, and means for restricting the wire twisting zone to cause said mechanism to shear off the surplus twisted ends of the wire.

9. In a baling device, rotatable wire twisting members, and wire latching means for causing said members to shear off the wires beyond a predetermined point by a twisting action.

10. In a baling device, wire twisting and breaking mechanism, and wire holding and latching mechanism for restricting the shearing zone of the wires.

In testimony whereof I have hereunto subscribed my name in the presence of two subscribing witnesses:

ROBERT McLAUGHLIN.

Witnesses:
C. H. GOWDY,
BELLE CABLE.